United States Patent [19]
Pagenkopf

[11] 3,712,327
[45] Jan. 23, 1973

[54] AUTOMATIC LEAK DETECTION AND SHUTOFF SYSTEM

[76] Inventor: Stanley W. Pagenkopf, 2309 East Avalon Street, Santa Ana, Calif. 92701

[22] Filed: March 23, 1971

[21] Appl. No.: 127,185

[52] U.S. Cl. .................................137/78, 307/118
[51] Int. Cl. .........................................F16k 17/36
[58] Field of Search .............73/29, 73; 137/78, 312; 251/68, 335 R; 200/61.04, 61.05; 307/118; 340/235; 338/34, 35

[56] References Cited

UNITED STATES PATENTS

| 1,772,232 | 8/1930 | Van Guilder | 200/61.05 |
| 2,439,523 | 4/1948 | Miller | 251/335 R X |
| 2,508,588 | 5/1950 | Waltman | 137/78 |
| 2,875,617 | 3/1959 | Murphy | 251/68 X |
| 2,895,708 | 7/1959 | Palumbo | 251/335 R X |
| 3,473,553 | 10/1969 | Collins | 251/68 X |
| 3,127,485 | 3/1964 | Vitolo | 200/61.05 |

Primary Examiner—Henry T. Klinksiek
Attorney—Roman A. Dimeo

[57] ABSTRACT

An automatic leak detection and shutoff system wherein a sensor comprised of a pair of electrical grids separated by a moisture sensitive substance is electrically connected to an electrical power source which in turn is electrically connected to a solenoid engaged with a spring activated valve positioned in the line of a system so that when the moisture sensitive substance is sufficiently moist, the moisture causes a short circuit between the electrical grids whereby a continuous electrical circuit is created resulting in an electrical flow from the power source thereby activating the solenoid which mechanically releases the spring actuated valve allowing said valve to close so as to prohibit further passage of fluid in the system.

10 Claims, 34 Drawing Figures

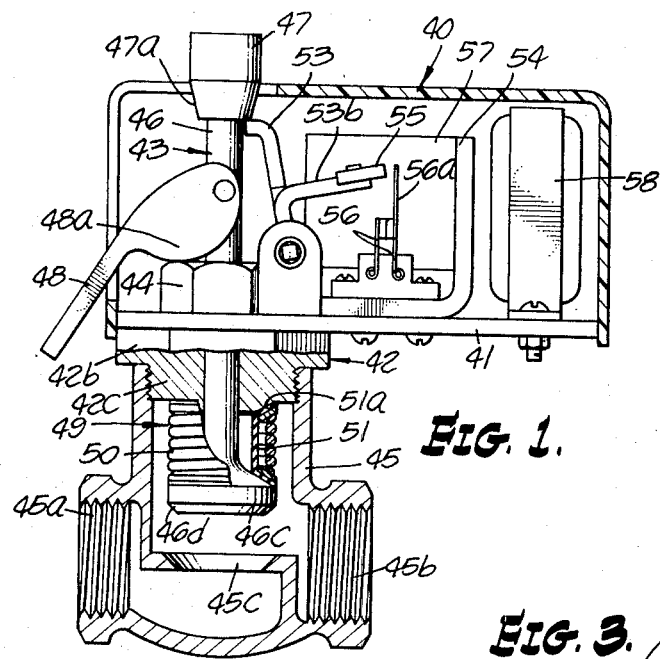
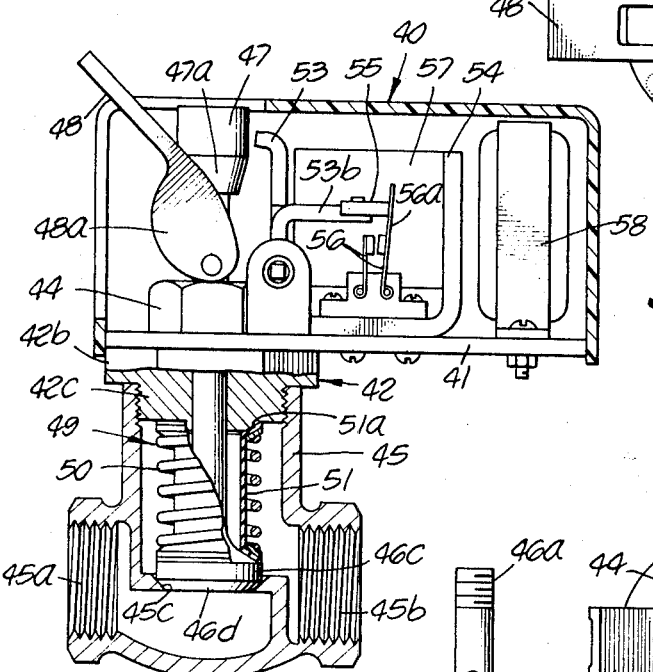
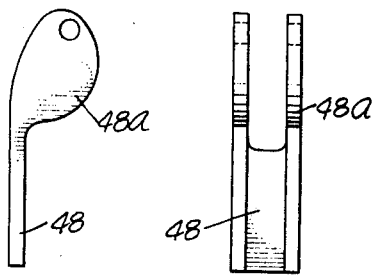
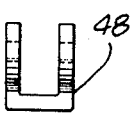
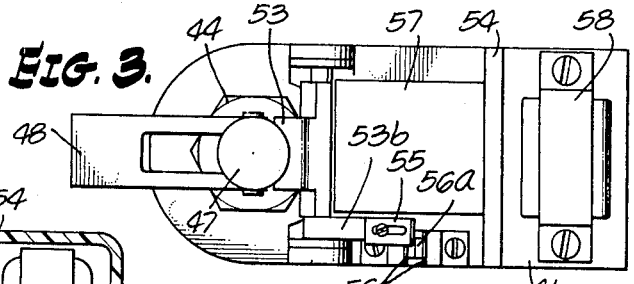
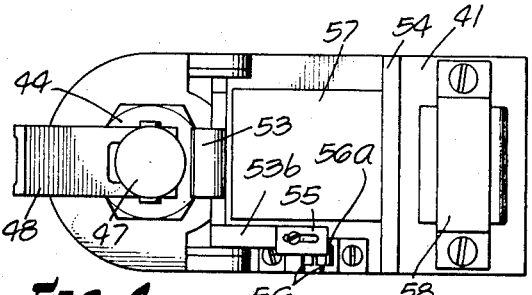
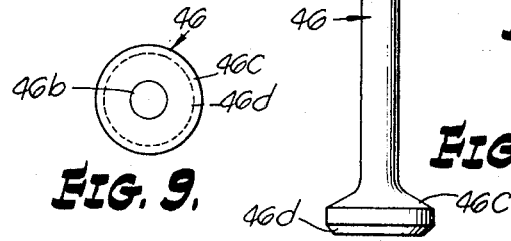
INVENTOR
STANLEY W. PAGENKOPF
BY
Roman G. Wilmes
ATTORNEY

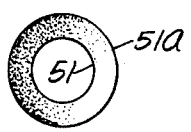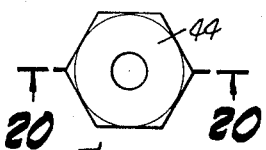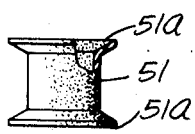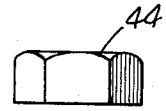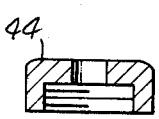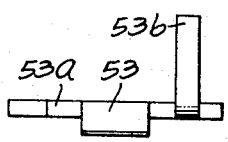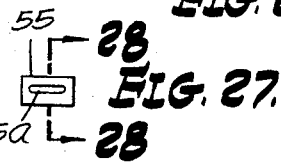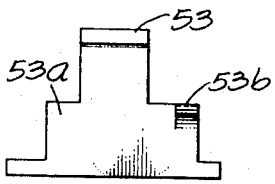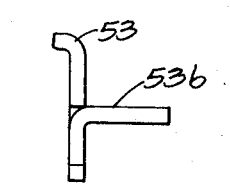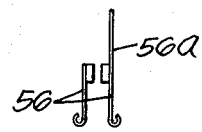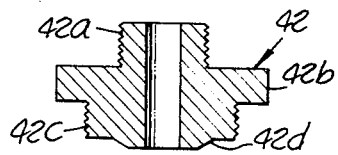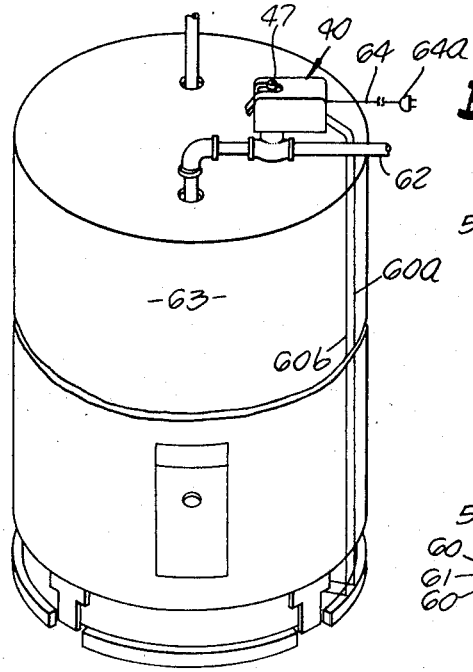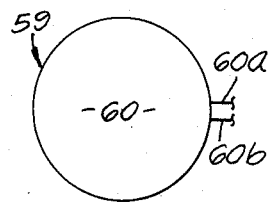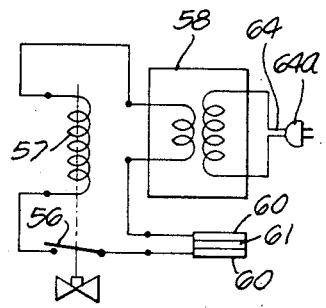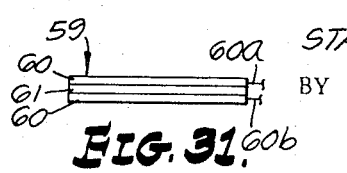

3,712,327

AUTOMATIC LEAK DETECTION AND SHUTOFF SYSTEM

The Automatic Leak Detection and Shutoff System of the instant invention consists of a spring actuated valve held in a normally open position by a detent. The detent is retracted by the magnetic force of a solenoid, thus allowing the force of the spring to close the valve. Although the valve disclosed here is a globe type valve, a gate type valve may be utilized without deviating from the scope of the invention herein. The solenoid is part of a circuit consisting of the solenoid, a low voltage power supply, a set of normally closed contacts and a moisture sensor, all connected electrically in series.

The sensor is comprised of a pair of electrode grids separated by a nonmetallic absorbent material which in its normally dry state provides an "open" or break in the circuit. When the sensor becomes wet or absorbs sufficient moisture, the circuit is closed or shorted and power from the power supply is conducted to the solenoid, thus supplying the magnetic force required to retract the detent.

As the valve stem travels downward to the closed position, it forces the detent back away from the valve stem. This backward motion of the detent mechanically opens the normally closed contacts so as to create a break in the electrical circuit, thereby terminating power to the solenoid. Thus, power is drawn from the power supply for only a fraction of a second.

After the nonmetallic absorbent material of the sensor becomes dry or is replaced, it again provides an "open" in the electrical circuit, making it possible to depress the reset lever which opens the valve and permits reseating of the detent. The system is now ready to detect any further leak of water or other liquid.

Thus, it can be seen that the use of this system will prevent the costly damage that results from plumbing and appliance leaks, liquid overflows and bursting tanks.

Since the automatic leak detection and shutoff system automatically senses the leakage of water or other liquid and shuts off its source, it could be used any place where the accumulation of water may occur due to plumbing and appliance leaks such as water heaters, washing machines, dish washers, water basins, etc. Further, it may be used with various types of water tanks in the home, on the farm, and in industry. The system has also many industrial uses other than with water, and can be used with almost any liquid. In the case of some liquids, however, some parts would have to be changed to be compatible with the liquids being sensed.

Other advantages of the invention will become apparent from the following description taken in conjunction with the accompanying drawings, in which:

FIG. 1 is a side elevational, partly sectioned view of the automatic leak detection and shutoff system of the instant invention showing the valve in the normally open position;

FIG. 2 is a side elevational, partly sectioned view of the automatic leak detection and shutoff system of the instant invention showing the valve of FIG. 1 in the closed position;

FIG. 3 is a top plan view of the system in the open position illustrated in FIG. 1;

FIG. 4 is a top plan view of the system in the closed position illustrated in FIG. 2;

FIG. 5 is a side view of the reset lever of FIGS. 1 and 2;

FIG. 6 is a bottom plan view of the reset lever of FIG. 5;

FIG. 7 is an end view of the reset lever of FIG. 5;

FIG. 8 is a side elevational view of the valve stem of FIGS. 1 and 2;

FIG. 9 is a bottom plan view of the valve stem of FIG. 8;

FIG. 10 is a side elevational view of the valve stem knob of FIGS. 1 and 2;

FIG. 11 is a side elevational, sectioned view of the valve stem knob of FIG. 10;

FIG. 12 is a bottom plan view of the valve stem knob of FIG. 10 taken on the line 11—11 thereof;

FIG. 13 is a side elevational view, partly sectioned, of the rubber boot of the spring assembly of FIGS. 1 and 2;

FIG. 14 is a top plan view of the rubber boot of FIG. 13;

FIG. 15 is a side elevational view of the spring of the spring assembly of FIGS. 1 and 2;

FIG. 16 is a side elevational view, partly sectioned, of the washers of the spring assembly of FIG. 15;

FIG. 17 is a top plan view of the washers of FIG. 16;

FIG. 18 is a side elevational view of the base plate nut of FIGS. 1 and 2;

FIG. 19 is a top plan view of the base plate nut of FIG. 18;

FIG. 20 is a side cross-sectional view of the base plate nut of FIG. 19 taken on the line 20—20 thereof;

FIG. 21 is a side elevational view of the valve nut of FIGS. 1 and 2;

FIG. 22 is a cross-sectioned view of the valve nut of FIG. 21 taken on the line 22—22 thereof;

FIG. 23 is a top plan view of the valve nut of FIG. 21;

FIG. 24 is a side elevational view of the detent of FIGS. 1 and 2;

FIG. 25 is a front elevational view of the detent of FIG. 25;

FIG. 26 is a top plan elevational view of the detent of FIG. 25;

FIG. 27 is a top plan elevational view of the detent contact actuator of FIGS. 1 and 2;

FIG. 28 is a sectioned side view of the contact actuator of FIG. 27 taken on the line 28—28 thereof;

FIG. 29 is a rear elevational view of the contact actuator of FIG. 27;

FIG. 30 shows the electrical contacts of FIGS. 1 and 2;

FIG. 31 is a side elevational view of the sensor of FIGS. 1 and 2;

FIG. 32 is a top plan view of the sensor of FIG. 31;

FIG. 33 is a schematic circuit diagram of the electrical circuit of the invention; and FIG. 34 is an illustration of the invention installed in conjunction with a conventional household water heater.

Referring to FIGS. 1-4, reference numeral 40 designates generally the automatic leak detection and shutoff system of the instant invention. Secured to base plate 41 by valve nut or bonnet 42 is valve assembly 43. Threaded portion 42a of valve nut 42 passes through an (not shown) in the base plate so that flange 42b abuts against the underside of said base plate. Base plate nut 44 (see FIGS. 18-20), which is larger than the aperture in the base plate, is threadedly engaged with threaded portion 42a of the valve nut, thereby securing said valve nut 42 to the base plate.

Valve nut 42 (as best shown in FIGS. 21–23) is also provided with a second threaded portion 42c having a beveled portion 42d and is threaded to valve housing 45. Valve housing 45, which is connected to the main fluid line, has an inlet 45a and an outlet 45b. Positioned between inlet 45a and outlet 45b is passageway 45c.

Passing through valve nut 42, the aperture in base plate 41 and base plate nut 44, is valve stem 46 comprised of an elongated stem member 46b having a threaded portion 46a at one end and a laterally flared portion 46c (see FIGS. 8 and 9). Laterally flared portion 46c is capable of cooperative engagement with valve housing 45 so as to prevent fluid passage through passageway 45c. The forward face of flared portion 46c has a beveled edge, as at 46d, so as to be tightly accommodated against the rim of passageway 45c thereby forming a positive seal.

Valve stem knob 47 provided with a beveled portion or shoulder 47a is threaded onto the threaded portion 46a of valve stem 46 (see FIGS. 10–12). The beveled portion 47a of valve stem knob 47 facilitates the depression of the valve stem when the shutoff system is activated and the detent 53 is retracted and also when the valve stem 46 is reset by allowing a gradual forward movement of the detent 53. It shall be noted that the valve stem knob 47 is threadedly adjustable to accommodate said detent 53 and yet keep the valve in a full open position.

Reset lever 48 is pivotably secured to valve stem 46 by a pin or the like and is provided with an eccentric cam portion 48a which is in engagement with the top surface of base plate nut 44 (see also FIGS. 5–7). When valve stem 46 is depressed by activation of the system, the reset lever 48 is at its uppermost position. By rotation of the reset lever 48 (and concomitantly the eccentric cam portion 48a) in a counterclockwise direction, the valve stem 46 is elevated and fluid flow is again permitted through the valve housing 45.

The spring assembly 49 consists of a compressed spiral spring 50 which encompasses a rubber boot 51 and a pair of conical washers 52 (See FIGS. 13–17). The two conical washers 52 are placed inside the spring with the ends 51a of the rubber boot overlapping the conical washers. The spring assembly is dimensioned so that it is slightly longer than required when the valve stem is in the closed position.

Thus, it can be seen that the spring assembly 49 provides the force required to close the valve. The spring assembly 49, in conjunction with the valve nut 44 and the flared portion 46d of the valve stem 46, also acts as a seal that makes in unnecessary to require valve packing. No force is therefore required to overcome the friction between the valve stem and packing which is presently necessary in common valves. Because of this construction, the valve stem 46, and those parts which it engages, never contact the fluid in the system. Thus, they are not subject to corrosion nor line debris which would interfere with, or prohibit the closure of common valves.

When assembled, spring assembly 49 is slipped over the valve stem 46 and is seated against the flared portion 46c of said valve stem. The valve stem 46 with the spring assembly 49 is then inserted into the valve housing 45. The valve nut 42 is then slipped over the valve stem 46 with the beveled portion 42d of the valve nut stem 46 facing downward. The beveled portion 42d of the 42 facing downward. The beveled portion 42d of the valve nut is seated against the upper flared portion 51a of the rubber boot 51 of spring assembly 49. This completes the water seal. Water pressure on the inside of the valve will force the rubber boot 51 away from the spring 50 so that it will not become pinched by, and foul said spring. Water pressure will also apply a force on the rubber boot 51 to maintain the upper and lower overlapping ends 51a thereof against conical washers 52, thus helping to insure a positive water-tight seal.

The forward end of the beveled portion 47a of valve stem nut 47 is engaged by detent 53 secured to a support member 53a which is pivotally secured to bracket 54 (see also FIGS. 24–26). Bracket 54 is in turn secured to base plate 41. Protruding laterally and away from support member 53a, is contact arm 53b provided with contact actuator 55 (as best seen in FIGS. 27–29).

Contact actuator 55 is secured to contact arm 53b by any conventional means passing through slot 55a whereby the contact actuator 55 may be adjusted so that when the detent 53 is rotated clockwise sufficiently to disengage and release the valve stem 46 due to the magnetic force of solenoid 57 (as will hereinafter be more fully described), the contact actuator engages the resilient rear contact 56a of paired electrical contacts 56 (see FIG. 30) which are electrically connected to solenoid 57.

When detent 53 is rotated still further, the contact 56a which, as aforesaid, is engaged by contact actuator 55, is forced away from the forward contact thereby again causing a break in the electrical circuit and terminating the magnetic force from solenoid 57. The resilience of the rear contact 56a provides the force required to return the detent 53 against the valve stem 46, when the valve stem is raised by depressing the reset lever 48.

Solenoid 57 is of a conventional type, which when activated by an electrical current will produce a magnetic field. It is secured to bracket 54 by any suitable conventional means and is electrically connected to a power source. Electrical power is derived through a transformer 58 secured to base plate 41 having an electrical cord for connection to an AC power source.

However, it should be understood that a low voltage wet or dry cell battery may be used without deviating from the scope of the invention because of the low power requirements and the fact that there would be no power drain on the battery until a leak actually occurred, and then for only a fraction of a second.

As aforesaid, solenoid 57 is electrically connected to transformer 58. When the sensor is short circuited by the liquid absorbed by the nonmetallic absorbent material, the electrical circuit is complete or "closed," resulting in an electrical current flow from the transformer 58 to solenoid 57 thereby activating the solenoid. The solenoid 57 thus creates a magnetic force which attracts detent 53 away from valve stem 46. When detent 53 disengages from valve stem 46 and clears valve stem knob 47, valve stem 46, through the action of conical spring 50, is displaced downwardly until beveled edge 46d of the flared portion 46c of the valve stem seats tightly against the accommodating rim of passageway 45c of valve housing 45 thereby prohibiting further passage of fluid through valve housing 45 and concomitantly to the remainder of the system.

As hereinbefore mentioned, when contact actuator 55 of detent 53 engages and subsequently separates the paired electrical contacts 56, the electrical circuit is again broken prohibiting further power from transformer 58 to solenoid 57. After the absorbent material in the sensor is replaced, the reset lever 48 is rotated counterclockwise lifting valve stem 56, thereby allowing resilient contact arm 56a to return detent 53 into engagement with said valve stem and to re-engage the other contact of the paired contacts 56 so as to again electrically connect solenoid 57 to transformer 58.

Sensor 59 as shown in FIGS. 31 and 32, is comprised of a pair of electrode grids 60 which may be substantially continuous metal plates or metallic wire mesh. Grids 60 are electrically connected to one side of transformer 58 by lead wire 60a and to one side of contacts 56 by lead wire 60b so as to form an electrical series circuit which is normally open at sensor 59 and capable of being opened at contacts 56.

Separating grids 60 is a nonmetallic absorbent wafer insulator 61. Insulator 61 may be conveniently formed by any fibrous material impregnated with sodium chloride. The insulator in its normally dry state acts to prevent the passage of current between the paired electrode grids 60. When the insulator becomes wet, it becomes conductive and provides a low impedance path between the electrode grids 60 thereby allowing the passage of current therebetween so as to complete the electrical circuit and activate the leak detection system.

The sensor 59 is cut to a size and shape that will assure complete coverage of the floor area below the water heater (see FIG. 34). Because of its construction, the sensor can be cut to any size and shape desired so as to provide the capability to sense the leakage of water under a large variety of circumstances and uses. Further, the upper electrode may be covered by a loosely woven nonabsorbent material that will easily allow the passage of water and yet prevent direct human contact with the electrode.

FIG. 34 shows the automatic leak detection and shutoff system 40 mounted in the line 62 leading to a conventional water heater 63. Sensor 59 is situated beneath the water heater and is electrically connected to system 40 be wire leads 60a and 60b. System 40 is provided with a conventional electrical cord 64 having a plug 64a for inserting into a conventional AC power source (not shown).

While one embodiment of the invention has been described, it is understood that the particular embodiment of the invention herein disclosed is for illustrative purposes only.

I claim:

1. An automatic leak detection and shutoff system, comprising:

a base plate, said plate provided with a bore passing therethrough;

hollow nut means passing through said bore in said base plate;

second nut means engaging said hollow nut means for securing the same to said base plate;

a valve housing having an inlet and an outlet port and an interconnecting passageway between said ports secured to said hollow nut means so as to form an enclosed chamber in said valve housing, said valve housing being provided with means for securement to a main fluid line;

an elongated valve stem means in slidable engagement with said second nut means projecting into said valve housing, said valve stem means having a radially extending end portion adapted to be accommodated in said passageway of said valve housing so as to seal said outlet port from said inlet port, said valve stem means provided with a laterally protruding shoulder means;

a nonmetallic casing impervious to liquid surrounding said valve stem means, said casing being situated in the valve housing chamber abutting the radially extending end of said valve stem means and the lower face of said hollow nut means;

washer means abutting each end of said casing to provide sealing and abutment means;

a compressed spring means surrounding said casing, said spring means being in compressive abutment engagement with said washer means;

lever means pivotally secured to said valve stem means for axially displacing said valve stem means through said hollow nut means;

a magnetic detent means pivotally secured to said base plate, said detent means being normally engaged by said shoulder means carried by said valve stem means, said detent means having a laterally extending contact arm;

electrically activated solenoid means secured to said base plate for providing a magnetic force so that when said solenoid means is electrically activated, said detent is disengaged and rotated away from said shoulder means provided by said valve stem means;

paired electrical conductive contact members electrically connected to said solenoid means adjacent said contact arm and situated so as to be engaged by said contact arm upon movement of said detent away from said shoulder means whereby said contact arm separates said contact members;

transformer means secured to said base plate and electrically connected to said solenoid means in series, said transformer means having means for electrical connection to an extraneous power source, and sensor means having a pair of electrical grids separated by a nonmetallic liquid absorbing material, one of said grids being electrically connected to one side of said transformer means and the other of said grids being electrically connected to one side of said solenoid so as to provide an electrical series circuit when said material is moistened.

2. An automatic leak detection and shutoff system as defined in claim 1, wherein said hollow nut means is provided with first thread means for threaded engagement with said valve housing and second thread means for threaded engagement with said second nut means, said first and second threaded means being separated by a flange means for abutment against said base plate.

3. An automatic leak detection and shutoff system as defined in claim 1, wherein said casing is outwardly flared at each end, said flared ends overlapping and accommodating said washer means.

4. An automatic leak detection and shutoff system as defined in claim 3, wherein said spring means compresses the flared ends of the casing into intimate contact with said washers so as to maintain said flared ends and said washers in tight engagement with the hollow nut means and radial end of said valve stem means, respectively, thereby providing a tight leak-proof seal.

5. An automatic leak detection and shutoff system as defined in claim 4, wherein said washer means are conical in configuration.

6. An automatic leak detection and shutoff system as defined in claim 1, wherein said lever means is provided with an eccentric cam portion having its curved periphery in constant slidable engagement with said second nut means.

7. An automatic leak detection and shutoff system as defined in claim 1, wherein said laterally projecting shoulder means carried by said valve stem means is comprises of an adjustable element threaded unto the end of the valve stem means opposite the radially extending end portion thereof, said adjustable member having an annular abutment shoulder formed by the forward end thereof.

8. An automatic leak detection and shutoff system as defined in claim 7, wherein the detent means has an end portion thereof outwardly projecting therefrom, said end portion being in abutting engagement with said annular abutment shoulder.

9. An automatic lead detection and shutoff system as defined in claim 1, wherein the electrical grids of the sensor means are comprised of wire mesh.

10. An automatic leak detection and shutoff system as defined in claim 1, wherein the liquid absorbing material of the sensor means is fibrous and impregnated with sodium chloride.

* * * * *